United States Patent
Kashihara et al.

(10) Patent No.: US 7,119,466 B2
(45) Date of Patent: Oct. 10, 2006

(54) ON-VEHICLE GENERATOR MOUNTING DEVICE

(75) Inventors: Toshiaki Kashihara, Tokyo (JP); Hideyuki Hayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/052,820

(22) Filed: Feb. 9, 2005

(65) Prior Publication Data
US 2006/0049706 A1 Mar. 9, 2006

(30) Foreign Application Priority Data
Sep. 7, 2004 (JP) ............... 2004-259461

(51) Int. Cl.
H02K 5/04 (2006.01)
H02K 5/26 (2006.01)

(52) U.S. Cl. .......................... 310/91; 310/89
(58) Field of Classification Search ............ 310/91
See application file for complete search history.

(56) References Cited

U.S. PATENT DOCUMENTS

| | | | | |
|---|---|---|---|---|
| 4,835,428 A | * | 5/1989 | Komurasaki et al. | 310/68 D |
| 4,980,589 A | * | 12/1990 | Ochi et al. | 310/68 D |
| 5,210,453 A | * | 5/1993 | Nelson | 310/51 |
| 5,629,575 A | * | 5/1997 | Cazal et al. | 310/91 |
| 5,686,773 A | * | 11/1997 | Sakakibara et al. | 310/91 |
| 5,760,513 A | * | 6/1998 | Morishita et al. | 310/91 |
| 6,324,744 B1 | * | 12/2001 | Banks et al. | 29/525.13 |
| 6,927,520 B1 | * | 8/2005 | Okawa | 310/217 |

FOREIGN PATENT DOCUMENTS

JP 64-54747 U 4/1989
WO 82-03735 * 10/1982

* cited by examiner

*Primary Examiner*—Burton Mullins
(74) *Attorney, Agent, or Firm*—Sughrue Mion, PLLC

(57) ABSTRACT

An on-vehicle generator mounting device includes: a stay provided with a first insertion hole; a front side mounting leg and a rear side mounting leg of the generator, both being disposed on two ends of the stay; a second insertion hole provided through one of the mounting legs; a cylindrical bush fitted movably into a fitting hole provided through the other of the mounting legs; a clamp nut disposed at the other mounting leg to be adjacent to and coaxially with the bush, so as not to turn within said aperture but with a gap in a radial direction therebetween; and a bolt inserted through the second insertion hole, first insertion hole and bush, the bolt being screw-engaged with the clamp nut. An end of the clamp nut protrudes outward of said aperture beyond an outer surface of the other mounting leg. The clamp nut screw-engaged with the bolt fixing the generator is prevented from corroding due to anti-freezing agent.

4 Claims, 3 Drawing Sheets

ON-VEHICLE GENERATOR MOUNTING DEVICE

BACKGROUND OF THE INVENTION

1. Field of the Invention

The present invention relates to an on-vehicle generator mounting device and, more particularly, to a structure of a device for fixing and mounting an on-vehicle generator onto an engine of a vehicle.

2. Description of the Related Art

As an example of conventional on-vehicle generator mounting device, for example, a "mounting device for an on-vehicle generator" is disclosed in the Japanese Utility Model Publication (unexamined) No. 54747/1989.

Specifically, this Japanese Utility Model Publication (examined) No. 54747/1989 discloses "an on-vehicle generator mounting device including: a stay attached to an engine of a vehicle and having an insertion hole for mounting the generator onto an engine of the vehicle; a front bracket side mounting leg and a rear bracket side mounting leg of the generator both located on two sides of the stay; an insertion hole provided through one of the mounting legs; a cylindrical mounting-span-adjusting bush movably fitted into a fitting hole provided through the other mounting leg; a clamp nut accommodated in the other mounting leg adjacent to and coaxially with the mounting-span-adjusting bush, so as not to turn and get out, with a gap in radial direction; and a bolt inserted through the insertion hole of the other mounting leg, through the insertion hole of the stay and through the mounting-span-adjusting bush, the bolt being screw-engaged with the clamp nut.

Thus, the Japanese Utility Model Publication (examined) No. 54747/1989 discloses "anon-vehicle generator mounting device" in which a clamp nut is fitted into a mounting leg, which is fitted to and holds a mounting-span-adjusting bush of a generator, in such a manner as to be adjacent to the mounting-span-adjusting bush concentrically, unable to turn and get out, with a gap in radial direction.

It is a recent trend that an on-vehicle generator is reduced in weight under the need of lightweight vehicle.

Accordingly, in the field of an on-vehicle generator, front bracket and rear bracket made of aluminum have been popularly employed.

As a clamp nut for mounting the on-vehicle generator onto a stay (for example, hexagon nut), carbon steel material is generally employed.

To prevent the clamp nut from rotating and getting out, in the mentioned conventional on-vehicle generator mounting device, a hexagonal hole is provided through a mounting leg on the front bracket side or rear bracket side so that a part of a hexagonal part coaxially adjacent to a mounting-span-adjusting bush of the clamp nut (normally a hexagonal nut of carbon steel) is in contact with the mounting-span-adjusting bush.

In such a conventional structure, there is a possibility that an aqueous solution of calcium chloride sprayed on the road to act as an anti-freezing agent (snow-removing agent) infiltrates between the hexagonal portion of the clamp nut of carbon steel and the hexagonal hole (hexagonal cylinder part) provided through the mounting leg of aluminum.

Since ionization tendency is different between carbon steel and aluminum, when the aqueous solution of calcium chloride remains for a long time between the hexagonal portion of the clamp nut of carbon steel and the hexagonal hole (hexagonal cylinder part) provided through the mounting leg of aluminum, bimetallic corrosion (contact corrosion with dissimilar metal) and/or crevice corrosion may take place.

When aluminum, being one of the dissimilar metals remains on the surface of the carbon steel in contact therewith, the dissimilar metal comes to corrode due to battery action between the metals. As a result, it is often the case that transfer of rust due to such bimetallic corrosion oxidizes the carbon steel.

That is, when a portion of the mounting leg (hexagonal cylinder part) made of aluminum, being one of dissimilar metals, remains in contact with surface of the clamp nut (carbon steel metal), the dissimilar metal corrodes due to battery action between metals, and the resulting rust corrodes the clamp nut.

In the above-mentioned conventional on-vehicle generator mounting device, once the hexagonal part of the clamp nut rusts, the hexagonal shape finally comes to be round due to corrosion, loosing the contact face between the hexagonal part of the clamp nut and the hexagonal hole (hexagonal cylinder part) provided through the mounting leg. As a result, a problem exists in that the generator is rendered unable to be mounted and removed due to slip of the mounting bolt with which the clamp nut is screw-engaged.

Moreover, because of a complete tubular shape (for example, cylindrical shape) of the mounting-span-adjusting bush, another problem exists in that the aqueous solution of calcium chloride remains in the cylindrical portion of the mounting-span-adjusting bush, resulting in serious corrosion.

SUMMARY OF THE INVENTION

The present invention was made to solve the above-discussed problems and has an object of providing an on-vehicle generator mounting device of high durability capable of preventing a clamp nut from corrosion due to aqueous solution of an anti-freezing agent or snow-removing agent (such as calcium chloride), the clamp nut being screw-engaged with an end portion of a bolt to fix and mount the generator onto a stay of a vehicle, thereby preventing the generator from not being mounted and removed due to corrosion of the clamp nut.

An on-vehicle generator mounting device according to the invention includes: a stay attached to an engine of a vehicle and provided with a first insertion hole; a front side mounting leg and a rear side mounting leg of the generator, both legs being disposed on two sides of the mentioned stay; a second insertion hole provided through one of the mentioned mounting legs; a cylindrical mounting-span-adjusting bush fitted to a fitting hole provided through the other of the mentioned mounting legs so as to be movable toward the central axis; a clamp nut disposed at the mentioned other mounting leg to be adjacent to and coaxially with the mounting-span-adjusting bush, so as not to turn and get out, with a gap in radial direction; and a bolt inserted through the second insertion hole of the mentioned one mounting leg, through the first insertion hole of the mentioned stay and through the mentioned mounting-span-adjusting bush, the mentioned bolt being screw-engaged with the mentioned clamp nut. An end of the mentioned clamp nut not being adjacent to the mentioned mounting-span-adjusting bush protrudes outward more than the mentioned other mounting leg.

In the on-vehicle generator mounting device according to the invention, since an end of the clamp nut not being adjacent to the mounting-span-adjusting bush is arranged to protrudes outward more the other mounting leg, even if an aqueous solution of chloride calcium sprayed to act as an anti-freezing agent remains between the clamp nut (for example, a nut with a hexagonal cross-section) and the hole provided through the mounting leg (for example, hexagonal cylinder part) for a long time, the protruding portion of the clamp nut outward more than the mounting leg is hardly corroded.

Accordingly, even when the corrosion of the clamp nut in the hole (hexagonal cylinder part) of the mounting leg takes place due to the aqueous solution of an anti-freezing agent (such as chloride calcium), it is possible to mount and remove (attach and detach) the generator onto and from an internal combustion engine by using the corrosive-resistant portion of the clamp nut protruding outward more than the mounting leg and a head of the bolt. As a result, an on-vehicle generator mounting device of high durability capable of preventing the generator from not being mounted and removed due to corrosion of the clamp nut is achieved.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
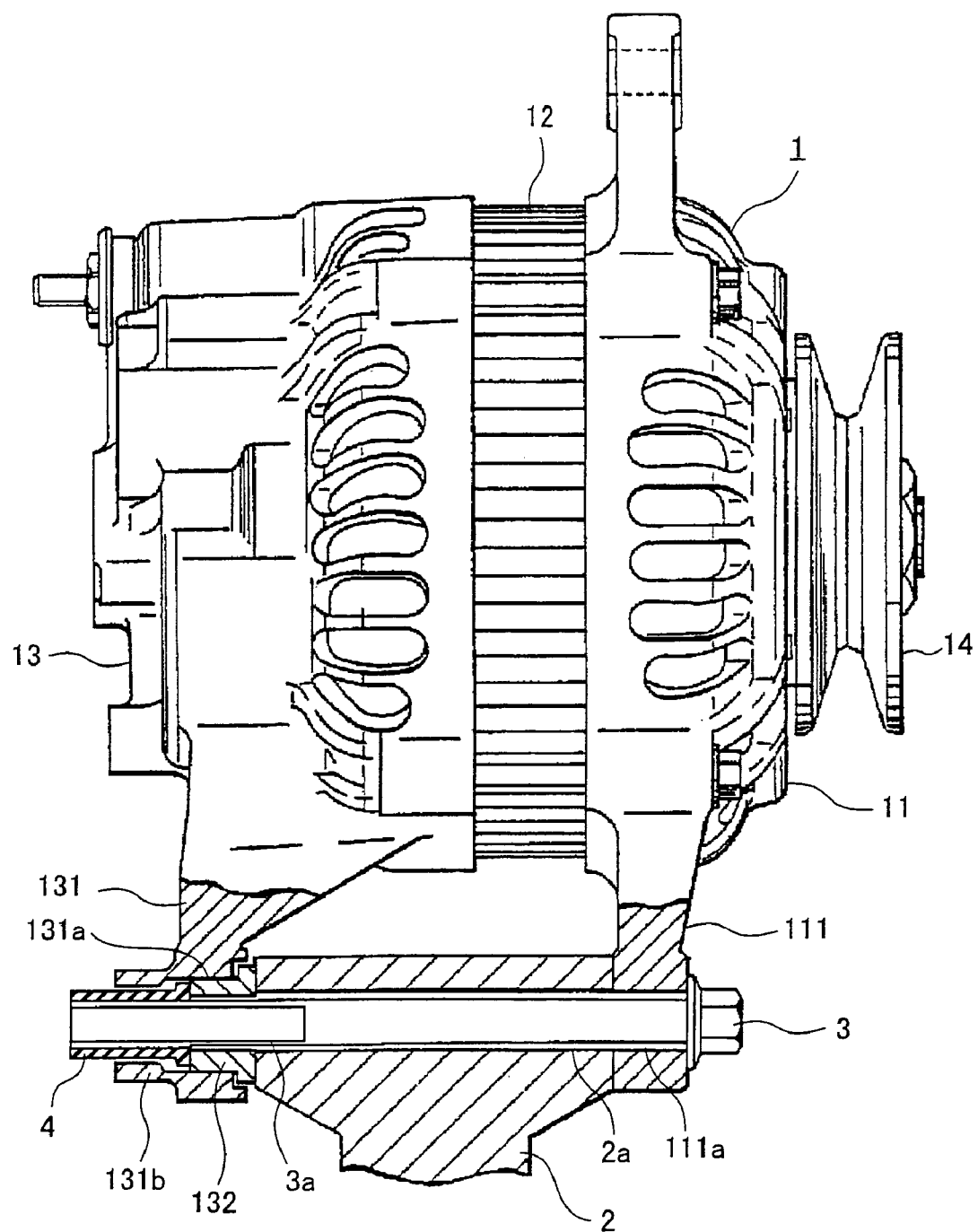
FIG. 1 is a partially longitudinal sectional front view of an on-vehicle generator mounting device according to Embodiment 1 of the present invention.

An on-vehicle generator mounting device according to an embodiment of the present invention is hereinafter described with reference to the accompanying drawings.

In addition, the same reference numerals designate the same or like parts throughout the drawings.

FIG. 1 is a partially longitudinal sectional front view of an on-vehicle generator mounting device according to Embodiment 1 of the invention.

With reference to FIG. 1, reference numeral 1 designates a generator to be mounted on an engine (not illustrated) of a vehicle, and the generator 1 is constituted of later-described members.

Numeral 2 designates a stay attached to the engine of the vehicle for mounting the generator 1. The stay 2 is provided with a first insertion hole 2a for mounting the generator 1 on the engine of the vehicle as shown in the drawing. Numeral 3 designates a bolt for fixing the generator onto the stay 2.

Numeral 11 designates a front bracket of the generator 1, and numeral 111 designates a front side mounting leg integrally constructed with the bracket 11 of the generator. The front side mounting leg 111 is provided with a second insertion hole 111a.

Numeral 12 designates a core of an armature coil, numeral 13 designates a rear bracket, and numeral 131 designates a rear side mounting leg of the generator 1 integrally constructed with the rear bracket 13. The rear side mounting leg 131 is provided with a fitting hole 131a.

In addition, from the viewpoint of reduction in weight of the generator 1, the front bracket 11 and the rear bracket 13 including the mounting legs are preferably composed of aluminum.

Numeral 132 designates a mounting-span-adjusting bush press fitted into the fitting hole 131a which is provided through the rear side mounting leg 131, the bush being a tube shape (cylindrical shape) provided with a through hole of an internal diameter slightly larger than an external diameter of the bolt 3. The mounting-span-adjusting bush 132 is movable in the press-fitting direction (i.e., in central axis direction) by a clamping force of the bolt 3 that fixes the generator 1 and a hexagonal nut 4 (clamp nut) later described.

Numeral 14 designates a pulley connected to a crank pulley of an engine of the vehicle by a belt and transmitting a driving force from the engine.

In addition, the front bracket 11, the core 12, the rear bracket 13 and the pulley 14 form an outer part of the generator 1.

The front side mounting leg 111 and the rear side mounting leg 131 are located on each side (each end portion) of the stay 2 provided with the first insertion hole 2a for mounting the generator 1 on the engine of the vehicle.

The bolt 3 for mounting the generator 1 on the stay 2 is inserted through the second insertion hole 111a provided through the front side mounting leg 111, the first insertion hole 2a provided through the stay 2 and the cylindrical mounting-span-adjusting bush 132, and is screw-engaged with the hexagonal nut (clamp nut) 4 at a screw portion 3a.

The generator 1 is mounted on the engine of the vehicle in such a manner that the mounting-span-adjusting bush 13 is moved by the fixing bolt 3 and the hexagonal nut (clamp nut) 4 in the axial direction with their clamping force and the stay 2 is press-fitted by the mounting-span-adjusting bush and the front side mounting leg 111.

In the on-vehicle generator mounting device of above-described construction according to this embodiment, it is to be noted that an end of the hexagonal nut (clamp nut) 4, the end not being adjacent to the mounting-span-adjusting bush 132, is arranged to protrude outward more than the mounting leg (shown as rear the side mounting leg 131 in the example of FIG. 1).

FIGS. 2(a) and (b) show an essential part of the on-vehicle generator mounting device according to Embodiment 1 of FIG. 1 and in which FIG. 2(a) is a front view of an essential part and FIG. 2(b) is a longitudinal sectional view of the essential part.

In addition, FIG. 2(a) is a view taken along the arrow A in FIG. 2(b).

Figure 2:
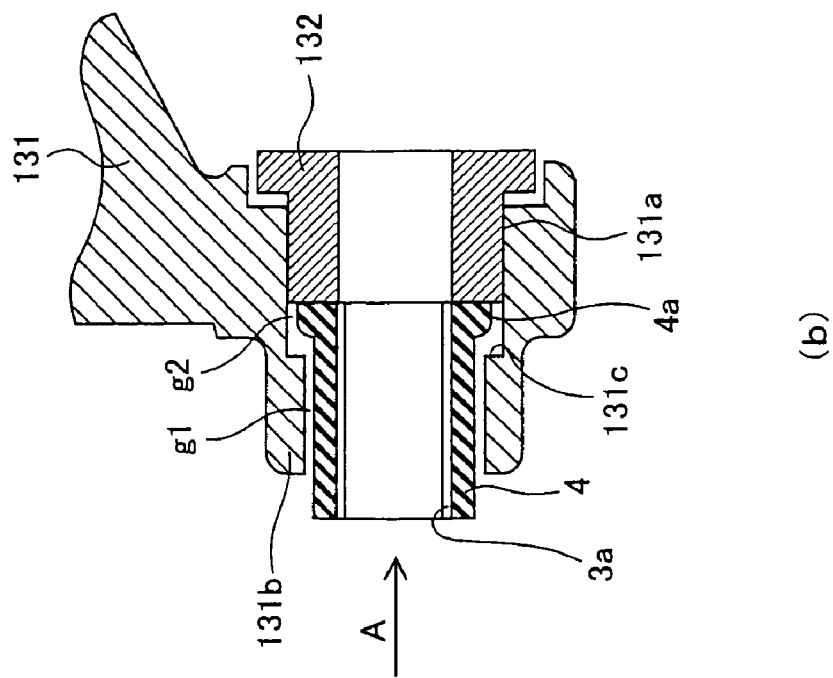
FIGS. 2(*a*) and (*b*) are a front view of an essential part and a longitudinal sectional view of the essential part of the on-vehicle generator mounting device according to Embodiment 1 of the invention.
Figure 2:
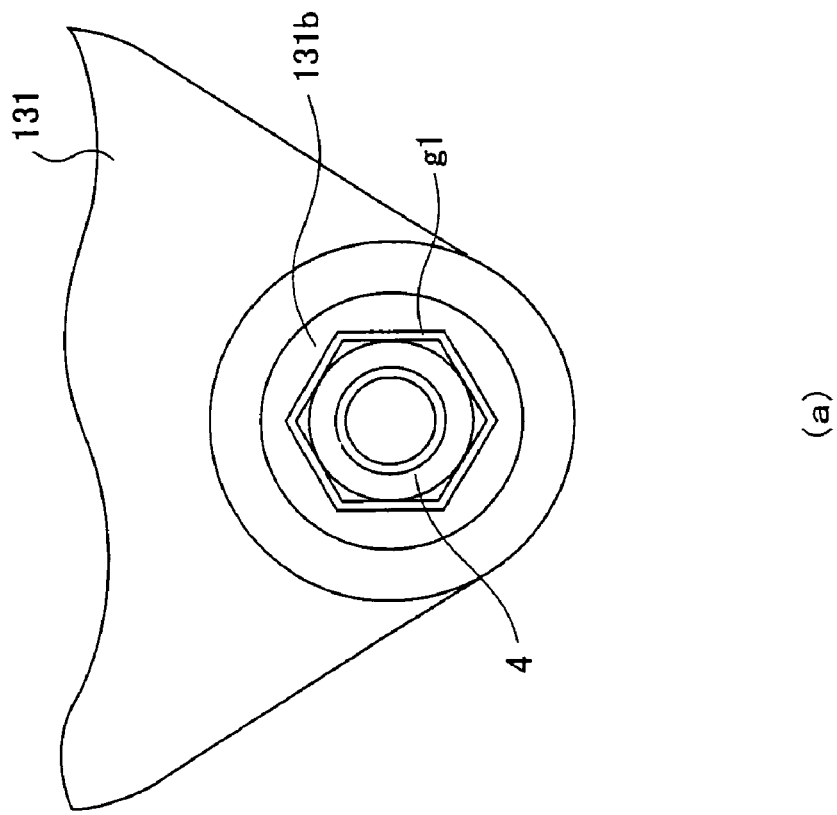

Now, with reference to FIG. 2, the characteristic feature of the on-vehicle generator mounting device according to this embodiment are hereinafter explained.

In the drawings, numeral 131b designates a hexagonal cylinder part provided through the rear side mounting leg 131 so as to communicate to the fitting hole 131a.

The hexagonal nut (clamp nut) 4 is arranged in this hexagonal cylinder part 131b so as to be concentrically adjacent to the mounting-span-adjusting bush 132 fitted to the fitting hole 131b.

Note that an end of the hexagonal nut (clamp nut) 4 on the side not being adjacent to the mounting-span-adjusting bush 132 is arranged to protrude outward more than the mounting leg (for example, the rear side mounting leg 131).

A gap g1 is secured between the hexagonal nut (clamp nut) 4 and the hexagonal cylinder part 131b, thereby the hexagonal nut (clump nut) 4 being unable to turn but having, to a certain extent, freedom of moving in radial direction (that is, in the direction orthogonal to the axial direction).

Further, a base part 41 of the hexagonal nut (clamp nut) 4 is housed in the fitting hole 131a with a gap g2 in radial direction, the fitting hole 131a having a larger diameter than the hexagonal cylinder part 131b. Accordingly, the hexagonal nut (clamp nut) 4 is prevented from getting out of the mounting leg owing to the engagement between the base part 41 and a step part 131c of the hexagonal cylinder part 131b.

The step part 131c is formed between an inner circumference of the hexagonal cylinder part 131c and the fitting hole 131a.

In such a construction, the bolt 3 is inserted through the second insertion hole 111a of the front side mounting leg 111, through the first insertion hole 2a of the stay 2 and through the mounting-span-adjusting bush 132, and is screwed in the hexagonal nut (clamp nut) 4.

Since the hexagonal nut (clamp nut) 4 is housed (disposed) in the rear side mounting leg 131 without possibility of turning or getting out, the bolt 3 can be screwed into the hexagonal nut (clamp nut) 4 without need of manually holding in the hexagonal nut (clamp nut) 4.

Accordingly, the mounting-span-adjusting bush 132 is made to shift, and the front side mounting leg 111 and the mounting-span-adjusting bush 132 are press-fitted to the stay 2, making it possible to fix the generator 1 to the engine of the vehicle.

Further, since the hexagonal nut (clamp nut) 4 has the gaps g1 and g2 in radial direction, even when the bolt 3 is not sufficiently straightforward, movement of the hexagonal nut (clamp nut) 4 in radial direction will, absorb such deficiency, and the hexagonal nut (clamp nut) 4 and the bolt 3 are prevented from defective clamping and breakage thereof.

In this on-vehicle generator mounting device according to this embodiment, the front bracket 11 and the rear bracket 13 including the mounting leg are made of aluminum, and the hexagonal nut (clamp nut) 4 is made of other metal different from aluminum (such as carbon steel).

Furthermore, the hexagonal cylinder part 131b housing the hexagonal nut (clamp nut) 4 so as not to turn and project is provided with the gaps g1 and g2 that allow the hexagonal nut (clamp nut) 4, being made of a dissimilar metal, to move the mounting-span-adjusting bush 132 in axial direction.

When an aqueous solution of anti-freezing agent or snow-removing agent (such as calcium chloride) sprayed on the road infiltrates and remains in the gaps g1 and g2, bimetallic corrosion and/or crevice corrosion may take place in the hexagonal cylinder part 131b, eventually resulting in corrosion of the hexagonal nut (clamp nut) 4.

However, in the on-vehicle generator mounting device according to this embodiment, an end of the hexagonal nut (clamp nut) 4 not being adjacent to the mounting-span-adjusting bush 132 is arranged to protrude outward more than the hexagonal cylinder part 131b of the mounting leg.

Accordingly, even when the corrosion of the clamp nut in the hole (for example, hexagonal cylinder part) of the mounting leg takes place due to the aqueous solution of anti-freezing agent (for example, chloride calcium), it is possible to mount and remove the generator onto and from an internal combustion engine by using the corrosive-resistant portion of the clamp nut protruding outward more than the mounting leg and a head of the bolt (which is normally hexagonal).

As described above, the on-vehicle generator mounting device according to this embodiment includes: a stay 2 attached to an engine of a vehicle and provided with a first insertion hole 2a; a front side mounting leg 111 and a rear side mounting leg 131 of the generator, both legs being disposed on two sides of the stay 2; a second insertion hole (for example, 111a) provided through one of the front side mounting leg 111 and the rear side mounting leg 131; a cylindrical mounting-span-adjusting bush 132 fitted to a fitting hole (for example, 131a) provided through the other of the front side mounting leg 111 and the rear side mounting leg 131 so as to be movable in the central axis direction; a clamp nut 4 disposed at the other mounting leg to be adjacent to and coaxially with the mounting-span-adjusting bush 132, so as not to turn and get out, with a gap in radial direction; and a bolt 3 inserted through the second insertion hole (for example, 111a) of the other mounting leg, through the first insertion hole 2a of the stay 2 and through the mounting-span-adjusting bush 132. The bolt 3 is screw-engaged with the clamp nut 4. An end of the clamp nut 4 not being adjacent to the mounting-span-adjusting bush protrudes outward more than the other mounting leg.

In the on-vehicle generator mounting device according to this embodiment, since the above-described construction is adopted, even when corrosion of the clamp nut in the hole (hexagonal cylinder part) of the mounting leg takes place due to an aqueous solution of anti-freezing agent, it is possible to mount and remove the generator onto and from an internal combustion engine by using the corrosive-resistant portion of the clamp nut protruding outward more than the mounting leg and a head of the bolt. As a result, an on-vehicle generator mounting device of high durability capable of preventing the generator from not being mounted and removed due to corrosion of the clamp nut is achieved.

Embodiment 2

Figure 3:
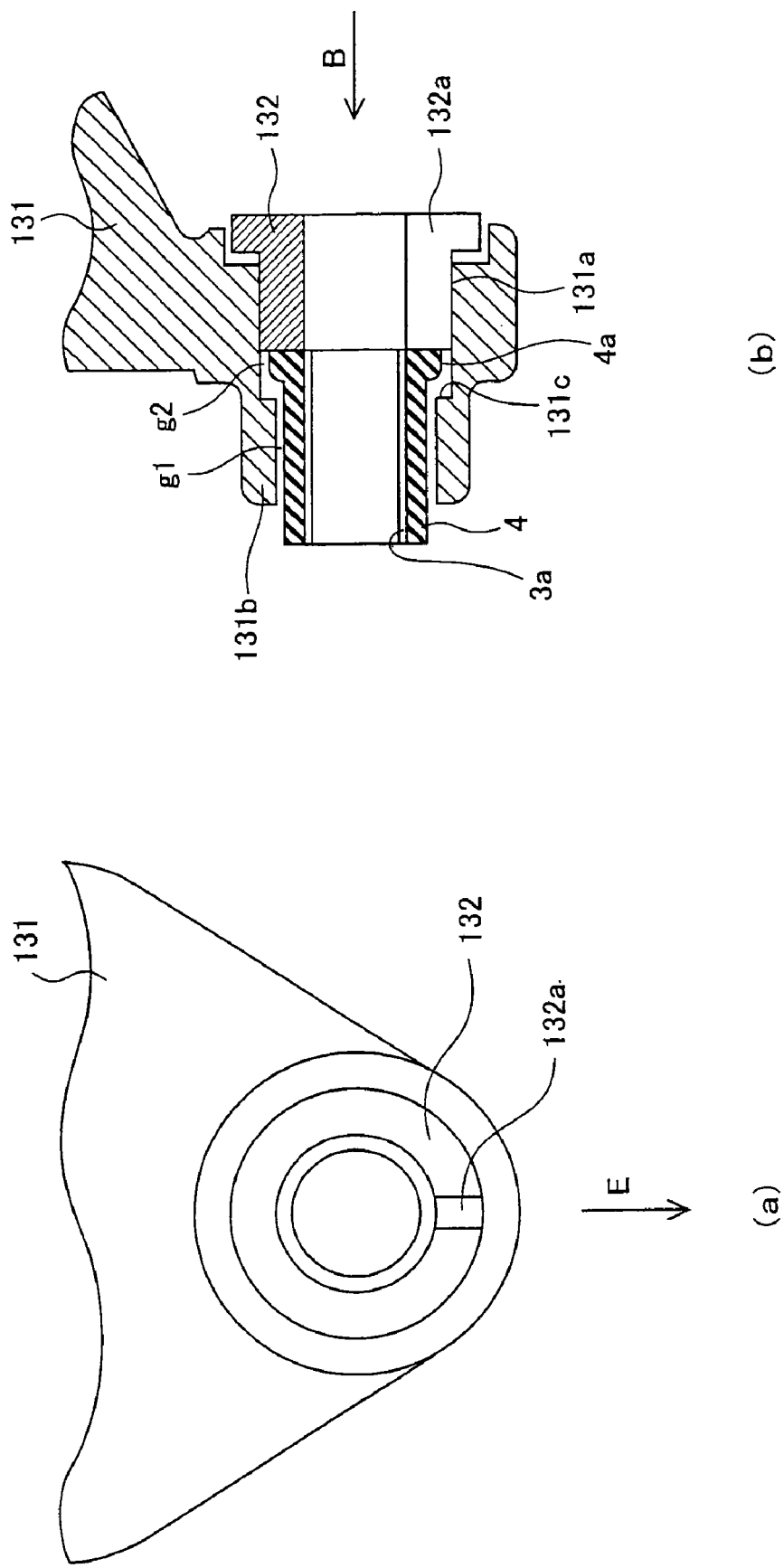
FIGS. 3(*a*) and (*b*) are a front view of an essential part and a longitudinal sectional view of the essential part of the on-vehicle generator mounting device according to Embodiment 2 of the invention.

FIGS. 3(a) and (b) show a construction of an essential part of an on-vehicle generator mounting device according to Embodiment 2, and in which FIG. 3(a) is a front view of an essential part and FIG. 3(b) is a longitudinal sectional view of the essential part.

In addition, FIG. 3(a) is a view taken along the arrow B in FIG. 3(b).

With reference to FIGS. 3(a) and (b), construction of an on-vehicle generator mounting device according to this Embodiment 2 is hereinafter described.

In the drawings, numeral 131b designates a hexagonal cylinder part provided through a rear side mounting leg 131 so as to communicate to a fitting hole 131a. In this hexagonal cylinder part 131b, a hexagonal nut (clamp nut) 4 is housed to be adjacent to and coaxially with a mounting-span-adjusting bush 132 fitted to the fitting hole 131a.

Note that an end of the hexagonal nut (clamp nut) 4 being not adjacent to the mounting-span-adjusting bush 132 is arranged to protrude outward more than a mounting leg (for example, rear side mounting leg 131).

A gap g1 is secured between the hexagonal nut (clamp nut) 4 and the hexagonal cylinder part 131b, thereby the hexagonal nut (clump nut) 4 being unable to turn but having, to a certain extent, freedom of moving in radial direction (that is, in the direction orthogonal to the axial direction).

Further, a base part 41 of the hexagonal nut (clamp nut) 4 is housed in the fitting hole 131a with a gap g2 in radial direction, the fitting hole 131a having a larger diameter than the hexagonal cylinder part 131b. Accordingly, the hexagonal nut (clamp nut) 4 is prevented from getting out of the mounting leg owing to the engagement between the base part 41 and a step part 131c.

The step part 131c is formed between the inner circumference of the hexagonal cylinder part 131b and the fitting hole 131a.

In such a construction, the bolt 3 is inserted through the second insertion hole 111a of the front side mounting leg 111, through the first insertion hole 2a of the stay 2 and through the mounting-span-adjusting bush 132, and is screw-engaged with the hexagonal nut (clamp nut) 4.

Since the hexagonal nut (clamp nut) 4 is housed (disposed) in the rear side mounting leg 131 without possibility of rotating or getting out, the bolt 3 can be screwed into the hexagonal nut (clamp nut) 4 without need of manually holding in the hexagonal nut (clamp nut) 4.

Accordingly, the mounting-span-adjusting bush 132 is made to shift, and the front side mounting leg 111 and the mounting-span-adjusting bush 132 are press-fitted to the stay 2, making it possible to fix the generator 1 to the engine of the vehicle.

Further, since the hexagonal nut (clamp nut) 4 has the gaps g1 and g2 in radial direction, even when the bolt 3 is not sufficiently straightforward, movement of the hexagonal nut (clamp nut) 4 in radial direction will absorb such deficiency, and the hexagonal nut (clamp nut) 4 and the bolt 3 are prevented from defective clamping and breakage thereof.

In this on-vehicle generator mounting device according to this embodiment, the front bracket 11 and the rear bracket 13 including the mounting leg are made of aluminum, and the hexagonal nut (clamp nut) 4 is made of other metal different from aluminum (such as carbon steel).

Furthermore, the hexagonal cylinder part 131b housing the hexagonal nut (clamp nut) 4 so as not to turn and project is provided with the gaps g1 and g2 that allow the hexagonal nut (clamp nut) 4, being made of a dissimilar metal, to move the mounting-span-adjusting bush 132 in axial direction.

When an aqueous solution of anti-freezing agent (such as calcium chloride) sprayed on the road infiltrates and remains in the gaps g1 and g2, bimetallic corrosion and/or crevice corrosion may take place in the hexagonal cylinder part 131b, eventually resulting in corrosion of the hexagonal nut (clamp nut) 4.

Note that in the on-vehicle generator mounting device according to this embodiment, in the same manner as in the foregoing Embodiment 1, an end of the hexagonal nut (clamp nut) 4, not being adjacent to the mounting-span-adjusting bush 132, is arranged to protrude outward more than the hexagonal cylinder part 131b of the mounting leg.

Accordingly, even if a clamp nut in a hole of a mounting leg (such as a hexagonal cylinder part) corrodes due to an aqueous solution of anti-freezing agent (such as calcium chloride), it is possible to attach and/or detach a generator to/from an inner combustion engine by using the corrosive-resistant portion of the clamp nut 4, protruding outward more than the mounting leg, and a head (which is normally hexagonal) of the bolt.

However, when the aqueous solution of anti-freezing agent (such as calcium chloride) sprayed on the road infiltrates and remains in the gaps g1 and g2 for a long time, bimetallic corrosion (contact corrosion with dissimilar metal) and/or crevice corrosion takes place and goes on, and deteriorates the hexagonal nut (clamp nut) 4 due to spread of the corrosion.

As a result, there still arises a possibility that the clamp nut 4 is broken, thereby the generator being rendered unable to be mounted and removed at the time of attaching to/detaching from the internal combustion engine utilizing the corrosive-resistant portion of the clamp nut 4 protruding outward more than the mounting leg (for example, the hexagonal cylinder part 131b of the rear side mounting leg) and the head of the bolt.

An on-vehicle generator mounting device according to this second embodiment was made to overcome such a problem.

As shown in FIGS. 3(a) and (b), the cylindrical mounting-span-adjusting bush 132 is provided with a notch 132a on the ground-direction E side of the generator 1 at the cylindrical portion facing to a road (ground surface) on which the vehicle runs and being most adjacent to the road surface, the notch 132a extending along the full length (i.e., in the direction parallel to the central axis) of the mounting-span-adjusting bush 132.

The ground-direction E herein indicates a direction perpendicular to the road (ground surface) on which the vehicle runs.

FIGS. 3(a) and (b) show a case that the notch 132a is formed on a part of the cylinder portion of the cylindrical mounting- span-adjusting bush 132 extending along the full length thereof. It is also preferable that the notch 132a is formed not along the full length but along only a part of the longitudinal direction.

In the on-vehicle generator mounting device of above construction, even when an aqueous solution of anti-freezing agent (for example, calcium chloride) infiltrates in the gaps g1 and g2, gravitation drains the aqueous solution to outside through the notch 132a, inhibiting the aqueous solution of anti-freezing agent from remaining in the gaps g1 and g1. Accordingly, it is possible to prevent the clamp nut 4 from being progressively corroded.

As a result, an on-vehicle generator mounting device with higher durability than that of the foregoing Embodiment 1 can be achieved.

Although the hexagonal nut (clamp nut) 4 and the mounting-span-adjusting bush 132 are housed (disposed) in the rear side mounting leg 131 in the above-mentioned Embodiments 1 and 2, it is also preferable that they are housed (disposed) in the front side mounting leg 111.

Further, although the clamp nut 4 is hexagonal in the foregoing embodiments, a clamp nut of any other shape such as square is preferably employed on condition that the nut is housed (disposed) so as not to turn.

Furthermore, in the case where the hexagonal nut (clamp nut) 4 is made of a strong corrosion resistant stainless steel, the hexagonal part can be prevented from corrosion, resulting in an on-vehicle generator mounting device of higher durability.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An on-vehicle generator mounting device comprising: a stay attached to an engine of a vehicle and provided with a first insertion hole; a front side mounting leg and a rear side mounting leg of the generator, said legs being disposed on respective sides of said stay; a second insertion hole provided through one of said front side mounting leg and rear side mounting leg; a cylindrical mounting-span-adjusting bush fitted to a fitting hole provided through the other of said front side mounting leg and rear side mounting leg so as to be movable along a central axis; a clamp nut disposed in an apertured portion of said other mounting leg to be adjacent to and coaxial with said mounting-span-adjusting bush, so as not to turn within said aperture but with a gap in a radial direction therebetween; and a bolt inserted through the second insertion hole of said one mounting leg, through the first insertion hole of said stay and through said mounting-span-adjusting bush, the bolt being screw-engaged with said clamp nut;

wherein an end of said clamp nut not being adjacent to said mounting-span-adjusting bush protrudes outward of said aperture beyond an outer surface of said other mounting leg.

2. The on-vehicle generator mounting device according to claim 1, wherein said mounting-span-adjusting bush is provided with a notch in a direction perpendicular to the road surface on which the vehicle runs.

3. The on-vehicle generator mounting device according to claim 2, wherein said notch is formed extending along the full length of said mounting-span-adjusting bush.

4. The on-vehicle generator mounting device according to claim 1, wherein said clamp nut is made of stainless steel.

* * * * *